(12) United States Patent
Barsness et al.

(10) Patent No.: US 10,216,861 B2
(45) Date of Patent: Feb. 26, 2019

(54) AUTONOMIC IDENTIFICATION AND HANDLING OF AD-HOC QUERIES TO LIMIT PERFORMANCE IMPACTS

(71) Applicant: International Business Machines Corporation, Armonk, NY (US)

(72) Inventors: Eric L. Barsness, Pine Island, MN (US); Robert J. Bestgen, Rochester, MN (US); Daniel E. Beuch, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 642 days.

(21) Appl. No.: 14/501,097

(22) Filed: Sep. 30, 2014

(65) Prior Publication Data
US 2016/0092599 A1    Mar. 31, 2016

(51) Int. Cl.
*G06F 17/30* (2006.01)
(52) U.S. Cl.
CPC .. *G06F 17/30979* (2013.01); *G06F 17/30424* (2013.01); *G06F 17/30448* (2013.01); *G06F 17/30483* (2013.01); *G06F 17/30501* (2013.01)
(58) Field of Classification Search
CPC ......... G06F 17/30979; G06F 17/30424; G06F 17/30448; G06F 17/30483; G06F 17/30501
See application file for complete search history.

(56) References Cited

U.S. PATENT DOCUMENTS

| 6,009,265 | A | * | 12/1999 | Huang | ............. G06F 17/30445 |
| 6,618,718 | B1 | | 9/2003 | Couch | |
| 7,395,537 | B1 | | 7/2008 | Brown et al. | |
| 8,046,354 | B2 | | 10/2011 | Day et al. | |
| 8,375,047 | B2 | | 2/2013 | Narayanan et al. | |
| 8,423,534 | B2 | * | 4/2013 | Burger | ............. G06F 17/30433 |
| | | | | | 707/718 |
| 8,447,776 | B2 | | 5/2013 | Barsness et al. | |

(Continued)

OTHER PUBLICATIONS

Chattopadhyay, Utsab. "Resource Governor." Official Pythian Blog. Pythian, 22 Nov. 2013. Accessed 17 Feb. 2017 from<https://www.pythian.com/blog/preventing-runaway-queries-using-resource-governor/>.*

(Continued)

*Primary Examiner* — Robert W Beausoliel, Jr.
*Assistant Examiner* — Arthur Ganger
(74) *Attorney, Agent, or Firm* — Peter J. Edwards (57) ABSTRACT

A method for processing a database query includes receiving a database query to be executed according to a first processing profile and determining whether the database query is likely to be an ad hoc query. The determining of whether the database query is likely to be an ad hoc query is based on a factor. The factor can include a query originator factor, a job type factor, a run history factor, or a query quality factor. A second processing profile is generated before executing the database query in response to determining that the database query is likely to be an ad hoc query. The second processing profile is configured to limit performance impacts, such as by providing a lower execution priority, prohibiting parallel database operations, limiting memory allocation, or delaying or blocking the query.

19 Claims, 4 Drawing Sheets

(56) References Cited

U.S. PATENT DOCUMENTS

| | | | |
|---|---|---|---|
| 8,600,977 B2* | 12/2013 | Dageville | G06F 17/30463 707/718 |
| 2009/0106320 A1* | 4/2009 | Dageville | G06F 17/30463 |
| 2010/0082603 A1* | 4/2010 | Krompass | G06F 17/30463 707/719 |
| 2011/0029539 A1 | 2/2011 | Raichura | |
| 2011/0270822 A1* | 11/2011 | Denton | G06F 17/30442 707/719 |
| 2012/0016901 A1 | 1/2012 | Agarwal et al. | |
| 2012/0150895 A1* | 6/2012 | Barsness | G06F 17/30424 707/769 |
| 2012/0203762 A1* | 8/2012 | Kakarlamudi | G06F 17/30463 707/718 |
| 2013/0080417 A1* | 3/2013 | Kashyap | G06F 17/30469 707/718 |
| 2013/0263117 A1* | 10/2013 | Konik | G06F 9/5077 718/1 |
| 2015/0015581 A1* | 1/2015 | Lininger | G06T 11/00 345/426 |
| 2015/0026692 A1* | 1/2015 | Ghosh | G06F 17/30424 718/103 |

OTHER PUBLICATIONS

Dijcks, Jean-Pierre. "Workload Management—Based on Execution Times." The Data Warehouse Insider Blog, Oracle, Oct. 7, 2010, retreived Dec. 15, 2017 from <blogs.oracle.com/datawarehousing/workload-management-ndash-based-on-execution-times.> (Year: 2010).*

Microsoft, "How to Troublshoot the Performance of Ad-Hoc Queries in SQL Server", Microsoft Support, Arcticle ID: 243588, © 2013 Microsoft. http://support.microsoft.com/kb/243588.

Niu et al., "Workload Adaptation in Autonomic DBMSs", CASCON '06: Proceedings of the 2006 Conference of the Center for Advanced Studies on Collaborative Research, Oct. 2006, Published by IBM Corp, Riverton, NJ, © 2006. DOI: 10.1145/1188966.1188984.

Oracle, "Chapter 15: Using SQL Plan Management", Oracle ® Database Performance Tuning Guide, 11 g Release 2 (11.2) E41573-03, Sep. 2013, © 2000, 2013 Oracle. http://docs.oracle.com/cd/E11882_01/server.112/e16638/optplanmgmt.htm#PFGRF007.

"TSQL: Find Queries Causing Too Many SQL Compilations and SQL ReCompliations Separately", Stack Exchange, Database Administrators, Questions, Posted Apr. 8, 2011. http://dba.stackexchange.com/questions/2124/tsql-find-queries-causing-too-many-sql-compilations-and-sql-recompilations-sepe.

* cited by examiner

AUTONOMIC IDENTIFICATION AND HANDLING OF AD-HOC QUERIES TO LIMIT PERFORMANCE IMPACTS

BACKGROUND

The present disclosure relates to databases, and more specifically, to identifying database queries that are likely to have an adverse impact on performance and to handling these queries in a way that reduces a possible adverse impact on performance.

Data is retrieved from a database with a database query. A database query is an expression that is evaluated by a database manager. A database query can be formulated in Structured Query Language (SQL). SQL defines a syntax for generating and processing queries that is independent of the actual structure and format of the database. When the database manager receives a query, it generally produces an access plan to execute the query in the database. A query optimizer or planner can be employed to evaluate expressions in a query, to optimize the query, and to generate the access plan.

SUMMARY

According to embodiments of the present disclosure, a computer-implemented method for processing a database query includes receiving a database query to be executed according to a first processing profile. The method includes determining whether the database query is likely to be an ad hoc query. The determining of whether the database query is likely to be an ad hoc query is based on a factor. In addition, the method includes generating a second processing profile before executing the database query in response to determining that the database query is likely to be an ad hoc query. The factor can include a query originator factor, a job type factor, a run history factor, or a query quality factor.

In various embodiments, the method can include executing the database query using the second processing profile. The first processing profile can include a first execution priority and the second processing profile can include a second execution priority. The second execution priority can be a lower priority than the first execution priority.

In various embodiments, the method can include executing the database query using the second processing profile. The first processing profile can include a parameter that indicates that executing the database query using parallel database operations is allowed. The second processing profile can include this parameter, but the parameter indicates that executing the database query using parallel database operations is prohibited.

In various embodiments, the method can include executing the database query using the second processing profile. The first processing profile can include a first memory allocation. The second processing profile can include a second memory allocation. The second memory allocation can be less than the first memory allocation. In an alternative, the first processing profile includes a first resource allocation. The second processing profile includes a second resource allocation. The second resource allocation can be less than the first resource allocation.

In various embodiments, the method can include executing the database query using the second processing profile. The second processing profile can include a parameter that delays execution of the query. In an alternative, the second processing profile includes a parameter that blocks execution of the query.

In various embodiments, the determining of whether the database query is likely to be an ad hoc query further can include determining a likelihood score. The second processing profile can be generated according to the likelihood score.

In addition, various embodiments are directed to a computing device and a computer readable storage medium for processing a database query.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to databases, and more specifically, to identifying database queries that are likely to have an adverse impact on performance and to handling these queries in a way that reduces the predicted adverse impact on performance. While the present disclosure is not necessarily limited to such applications, various aspects of the disclosure may be appreciated through a discussion of various examples using this context.

It is not uncommon for database queries written by inexperienced users to take high amounts of system resources on production machines. Inexperienced users can write queries that are poorly constructed, which require excessive resources to get the needed data from the database. In addition, inexperienced users can write queries that may not be precisely what the user intends. The queries extract too much, too little, or incorrect data, and the queries are typically revised, refined, and run several times. Poorly constructed queries that require significant resources are referred to herein as ad hoc queries. Ad hoc queries are predicted or expected to have an adverse impact on performance. According to various embodiments, database queries that are likely to be ad hoc queries are identified before the query is run. If it is determined that a query is likely to be an ad hoc query, a second processing profile for the query is generated and substituted for the original processing profile associated with the query. The second processing profile can implement various strategies for reducing a possible adverse impact on performance.

Figure 1:
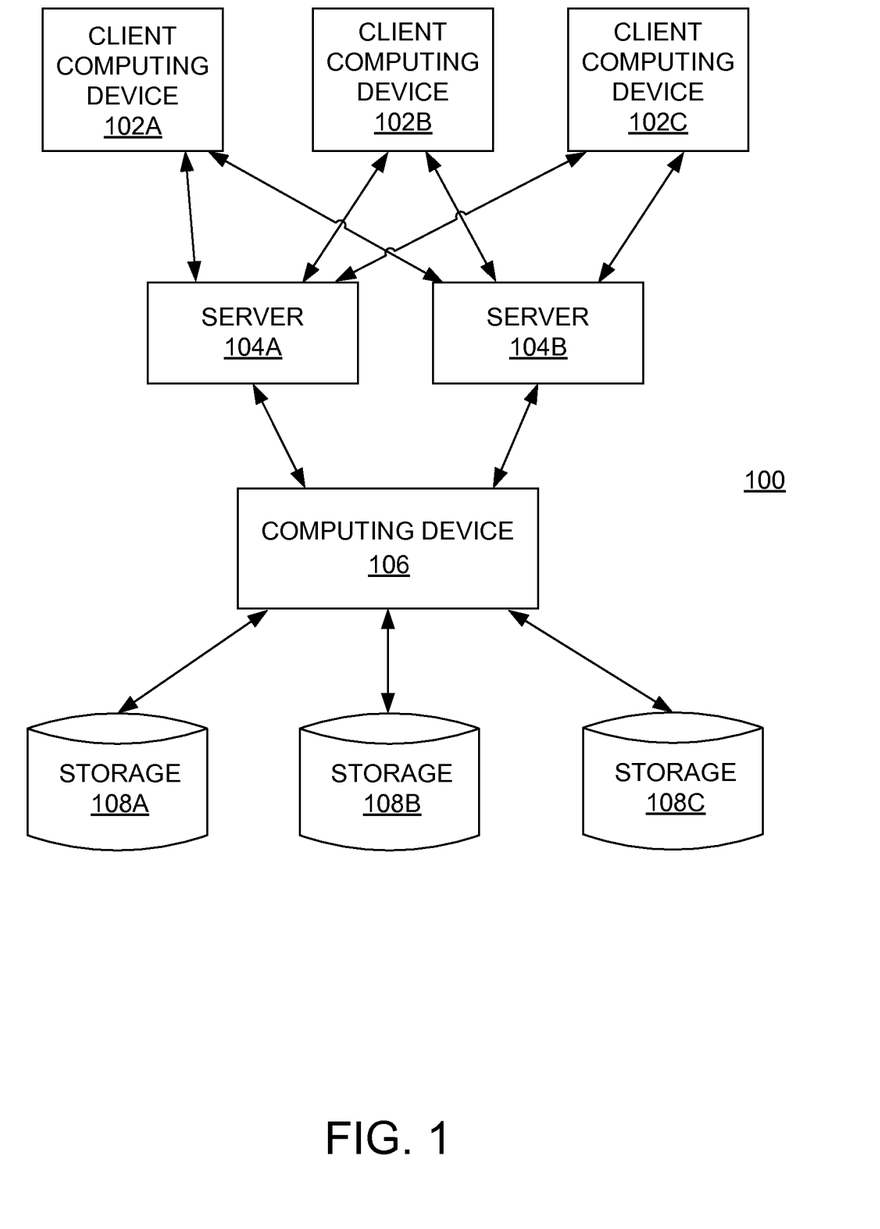
FIG. 1 is a block diagram of an example network architecture for a database system according to various embodiments.

FIG. 1 is a block diagram of an example network architecture for a database system 100 according to various embodiments. Any number of client computing devices 102 may be included in the architecture. In the figure, three client computing devices 102A, 102B, and 102C are shown. The database system 100 is accessed in this example via a cluster of servers 104A and 104B, that may be referred to as a middle tier. A database management system runs on a computing device 106. The database may be stored in a memory of the computing device 106 or may be spread across multiple storage devices. In the figure, storage devices 108A, 108B, and 108C for storing a database are shown. Many more storage devices may be provided. Database objects may be spread across the storage devices 108. The storage devices 108 are further described below with respect to FIG. 2.

Figure 2:
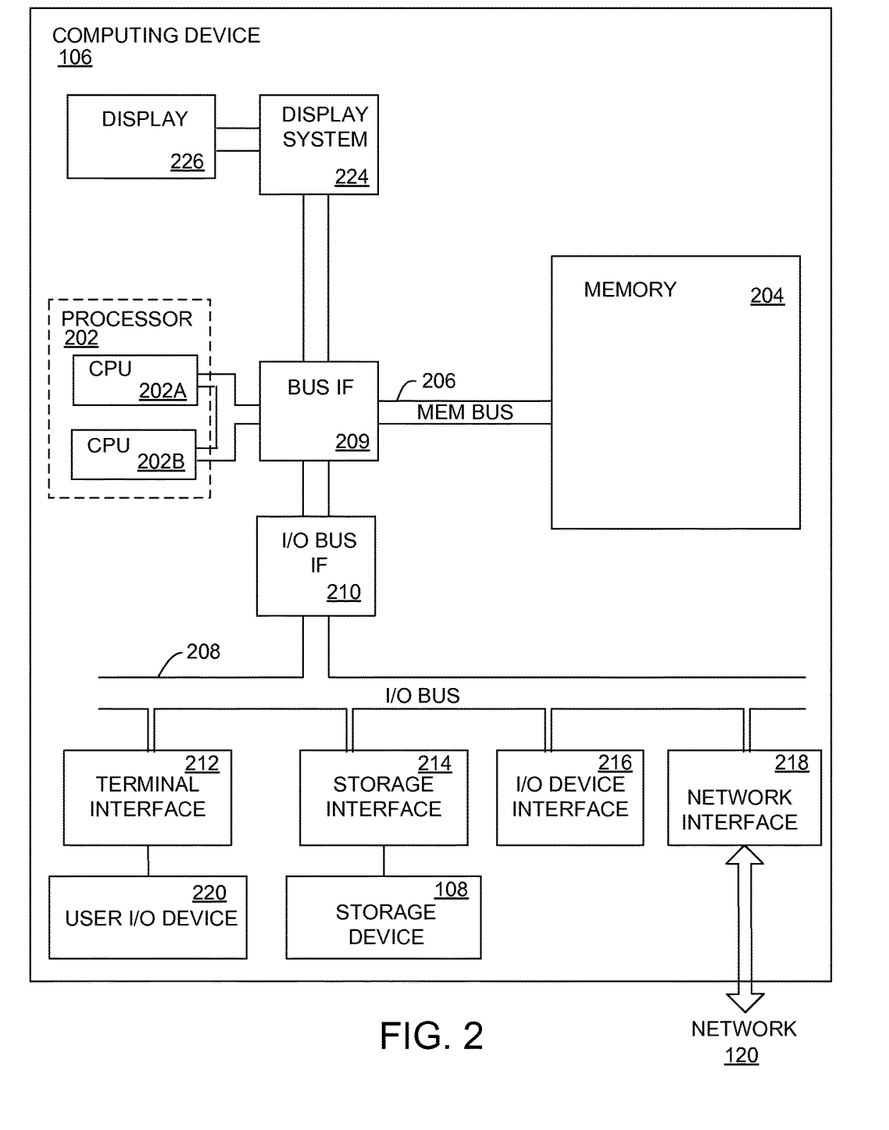
FIG. 2 is a block diagram of a computing device according to various embodiments.

FIG. 2 is a block diagram of the computing device 106 according to various embodiments. The computing device 106 is one example of a context in which various embodiments may be implemented. The mechanisms and apparatus of the various embodiments disclosed herein apply equally to any appropriate computing device. The major components of the computing device 106 include one or more processors 202, a memory 204, a terminal interface 212, a storage interface 214, an Input/Output ("I/O") device interface 216, and a network interface 218, all of which are communicatively coupled, directly or indirectly, for inter-component communication via a memory bus 206, an I/O bus 208, bus interface unit ("IF") 209, and an I/O bus interface unit 210.

The computing device 106 may contain one or more general-purpose programmable central processing units (CPUs) 202A and 202B, herein generically referred to as the processor 202. In an embodiment, the computing device 106 may contain multiple processors; however, in another embodiment, the computing device 106 may alternatively be a single CPU device. Each processor 202 executes instructions stored in the memory 204 and may include one or more levels of on-board cache.

In an embodiment, the memory 204 may include a random-access semiconductor memory, storage device, or storage medium (either volatile or non-volatile) for storing or encoding data and programs. In another embodiment, the memory 204 represents the entire virtual memory of the computing device 106, and may also include the virtual memory of other computer systems coupled to the computing device 106 or connected via a network 120. The memory 204 is conceptually a single monolithic entity, but in other embodiments the memory 204 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

Figure 3:
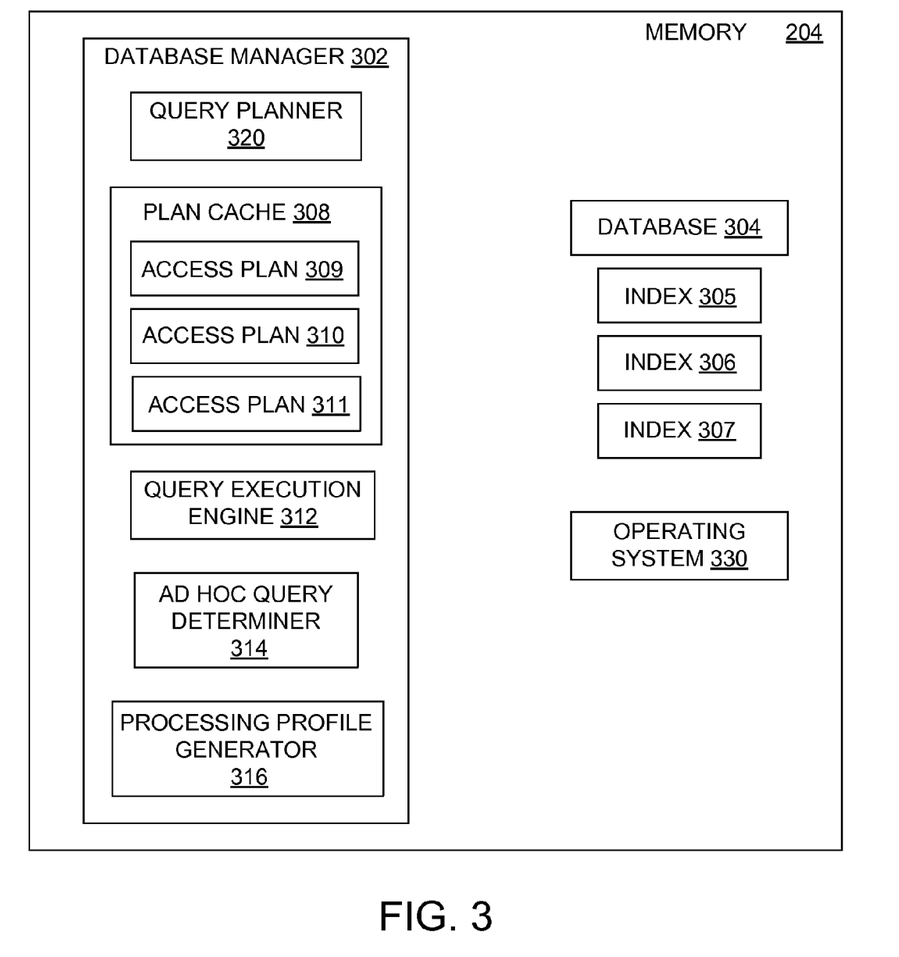
FIG. 3 is a block diagram showing an example of components and data that can reside in the memory of the computing device according to various embodiments.

FIG. 3 is a block diagram showing an example of components and data that can reside in the memory 204 of FIG. 2, according to various embodiments. The components and data shown in FIG. 3 are described in greater detail below. The memory 204 may store all or a portion of the components and data shown in FIG. 3. These programs and data structures are illustrated in FIG. 3 as being included within the memory 204 in the computing device 106, however, in other embodiments, some or all of them may be on different computer systems and may be accessed remotely, e.g., via a network 120. The computing device 106 may use virtual addressing mechanisms that allow the programs of the computing device 106 to behave as if they only have access to a large, single storage entity instead of access to multiple, smaller storage entities. Thus, while the components and data shown in FIG. 3 are illustrated as being included within the memory 204, these components and data are not necessarily all completely contained in the same storage device at the same time. Further, although the components and data shown in FIG. 3 are illustrated as being separate entities, in other embodiments some of them, portions of some of them, or all of them may be packaged together.

In an embodiment, the components and data shown in FIG. 3 may include instructions or statements that execute on the processor 202 or instructions or statements that are interpreted by instructions or statements that execute on the processor 202 to carry out the functions as further described below. In another embodiment, the components shown in FIG. 3 may be implemented in hardware via semiconductor devices, chips, logical gates, circuits, circuit cards, and/or other physical hardware devices in lieu of, or in addition to, a processor-based system. In various embodiments, the components shown in FIG. 3 may include data in addition to instructions or statements.

Referring to FIG. 2, the computing device 106 may include a bus interface unit 209 to handle communications among the processor 202, the memory 204, a display system 224, and the I/O bus interface unit 210. The I/O bus interface unit 210 may be coupled with the I/O bus 208 for transferring data to and from the various I/O units. The I/O bus interface unit 210 communicates with multiple I/O interface units 212, 214, 216, and 218, which are also known as I/O processors (IOPs) or I/O adapters (IOAs), through the I/O bus 208. The display system 224 may include a display controller, a display memory, or both. The display controller may provide video, audio, or both types of data to a display device 226. The display memory may be a dedicated memory for buffering video data. The display system 224 may be coupled with a display device 226, such as a standalone display screen, computer monitor, television, or a tablet or handheld device display. In an embodiment, the display device 226 may include one or more speakers for rendering audio. Alternatively, one or more speakers for rendering audio may be coupled with an I/O interface unit. In alternate embodiments, one or more of the functions provided by the display system 224 may be on board an integrated circuit that also includes the processor 202. In addition, one or more of the functions provided by the bus interface unit 209 may be on board an integrated circuit that also includes the processor 202.

The I/O interface units support communication with a variety of storage and I/O devices. For example, the terminal interface unit 212 supports the attachment of one or more user I/O devices 220, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 220 and the computing device 106, and may receive output data via the user output devices. For example, a user interface may be presented via the user I/O device 220 or display device 226, such as displayed on a display device, played via a speaker, or printed via a printer.

The storage interface 214 supports the attachment of one or more disk drives or direct access storage devices 108 (which are typically rotating magnetic disk drive storage devices, although they could alternatively be other storage devices, including arrays of disk drives configured to appear as a single large storage device to a host computer, or solid-state drives, such as flash memory). While only one storage interface 214 is shown in the figure, multiple storage interface units 214 may be provided. For example, one storage interface 214 may be provided for each of multiple storage devices, e.g., devices 108A, 108B, and 108C, in order to provide a capability to access different portions of a database spread across the multiple storage devices in parallel. In another embodiment, the storage device 108 may be implemented via any type of secondary storage device. The contents of the memory 204, or any portion thereof, may be stored to and retrieved from the storage device 108 as needed. The I/O device interface 216 provides an interface to any of various other I/O devices or devices of other types, such as printers or fax machines. The network interface 218 provides one or more communication paths from the computing device 106 to other digital devices and computer systems; these communication paths may include, e.g., one or more networks 120.

Although the computing device 106 shown in FIG. 2 illustrates a particular bus structure providing a direct communication path among the processors 202, the memory 204, the bus interface 209, the display system 224, and the I/O bus interface unit 210, in alternative embodiments the computing device 106 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 210 and the I/O bus 208 are shown as single respective units, the computing device 106 may, in fact, contain multiple I/O bus interface units 210 and/or multiple I/O buses 208. While multiple I/O interface units are shown, which separate the I/O bus 208 from various communications paths running to the various I/O devices, in other embodiments, some or all of the I/O devices are connected directly to one or more system I/O buses.

In various embodiments, the computing device 106 is a multi-user mainframe computer system, a single-user system, or a server computer or similar device that has little or no direct user interface, but receives requests from other computer systems (clients). In other embodiments, the computing device 106 may be implemented as a desktop computer, portable computer, laptop or notebook computer, tablet computer, pocket computer, telephone, smart phone, or any other suitable type of electronic device.

FIGS. 2 and 3 are intended to depict the representative major components of the computing device 106. Individual components, however, may have greater complexity than represented in FIGS. 2 and 3, components other than or in addition to those shown in FIGS. 2 and 3 may be present, and the number, type, and configuration of such components may vary. Several particular examples of additional complexity or additional variations are disclosed herein; these are by way of example only and are not necessarily the only such variations. The various program components illustrated in FIG. 3 may be implemented, in various embodiments, in a number of different manners, including using various computer applications, routines, components, programs, objects, modules, data structures, etc., which may be referred to herein as "software," "computer programs," or simply "programs."

FIG. 3 depicts an example of some components and data that can reside in the memory 204, according to various embodiments. In example memory 204, the memory stores an operating system 330. A database manager 302 and a database 304 can be stored in the memory 204. Multiple indices for use in accessing the database 304, such as index 305, index 306, and index 307, can be stored in the memory 204. According to various embodiments, the database manager 302 can include a query planner 320, a query execution engine 312, an ad hoc determiner 314, and a processing profile generator 316. The query planner 320 generates query execution strategies for performing database queries. The amount of time or resource required to perform a complex query on a large database can vary greatly, depending on various factors, such as the availability of an index, the amount of resources required to evaluate each condition, and the expected selectivity (i.e., number of records eliminated from consideration) of the various logical conditions. The query planner 320 determines an optimal execution strategy according to any optimizing algorithm, now known or hereafter developed, and generates an execution strategy, also known as an "access plan", according to the determination. The execution strategy is a defined series of steps for performing the query, and thus is, in effect, a computer program. The query planner 320 which generates the execution strategy performs a function analogous to that of a compiler, although the execution strategy data is not necessarily executable-level code. It is, rather, a higher-level series of statements which are interpreted and executed by query engine 312.

A query can be saved as a persistent storage object in memory, and can be written to disk or other storage. Once created by query planner 320, a query execution strategy (or access plan) can be saved with the query as part of the persistent storage object. For a given query, it is possible to generate and save one or multiple optimized execution strategies. The query can be invoked, and a saved query strategy re-used (re-executed), many times. In the example shown in FIG. 3, the memory 204 stores access plans 309, 310, and 311. The query execution engine 312 executes logical queries of database 304 using an access plan generated by the query planner 320.

The memory 204 can include an ad hoc determiner 314. According to various embodiments, a determination can be made as to whether a database query is likely to be an ad hoc query. This determination can be made by the ad hoc determiner 314.

An ad hoc database query can be a query that is made with no planning or minimal planning because of an immediate need or lack of user expertise. In addition, an ad hoc query can be a query that is made with no planning or minimal planning or a query that is used one time for a particular purpose. An ad hoc query may have a negative impact on system performance. In contrast, a database query developed by an expert and which is run repeatedly on a periodic basis is one example of a query that is not ad hoc in nature.

A determination as to whether a database query is likely to be an ad hoc database query can be made using one or more factors. Various factors that can be used to determine a likelihood that a particular query is ad hoc in nature include a query originator factor, a job type factor, a run history factor, or a query quality factor. In addition, other factors may be used.

A query originator factor can be based on an internet protocol (IP) address or a user identification (ID). A database query generally originates from a particular source that is identifiable by IP address or user ID, or both IP address and user ID. A list or set of sources that are generally known not to be associated with queries that are ad hoc in nature can be provided. For example, a database system may be configured so that queries to a database server generally originate from a cluster of servers in a middle tier. There is typically a relatively small set of IP addresses and user IDs associated with the middle tier servers. The set of IP addresses and user IDs associated with the middle tier could be configured when the system is initially set up. The set can be updated periodically or when a node is added or removed. Alternatively, the set can be determined dynamically. When a query is received, it can be determined whether its IP address or user ID are in the set. A query associated with an IP address or user ID in the set is likely not to be an ad hoc query. A query associated with an IP address or user ID that is not in the set is more likely to be an ad hoc query than one associated with an IP address or user ID in the set. For example, a query associated with an IP address or user ID not on the list is a possible ad hoc query because it originates from a source other than the middle tier of servers. In another alternative, it can be determined whether a database query with a user ID that signs on using an interactive session. A database system may be configured so that queries to a database server are generally associated with a user ID that cannot sign on interactively. In this alternative, it can be determined that a query is a possible ad hoc query if the query is associated with a user ID that is signed on using an interactive session.

A job type factor can be determined based on the type of job. A database query can be an interactive job, a scheduled job, or a batch job. A query in scheduled job or a batch job is likely not to be an ad hoc query. A query in an interactive job is more likely to be an ad hoc query than one in a scheduled or batch job.

A run history factor can be determined from a file or database of queries run against the database. One example of a query history file or database is an SQL plan cache. An SQL plan cache contains plans for SQL queries that have been run against the data base. An SQL plan cache could contain all plans run since the database was created or large percentage of plans run against the database in a time period, such as the most recent 12 months. Accordingly, a plan cache can contain most if not all of the queries that have been run against the database. When a query is received, it can be determined whether a plan for the query is present in the run history database, e.g., plan cache. If a query is present in a run history database, the query is likely not to be an ad hoc query. If a query is not present in the run history database, the query is more likely to be an ad hoc query than one that is in the database.

A query quality factor can be based on an automated evaluation of a query. When a query is received, it can be determined whether the query is able to use an index. A query that is able to use an index is less likely to be an ad hoc query than a query that is unable to use an index. In addition, the query can be parsed so that it can be determined whether the query includes a wild card or uses literals instead of parameter markers. A query that includes a wild card is more likely to be an ad hoc query than a query that does not include a wild card. Similarly, a query that includes literals instead of parameter markers is more likely to be an ad hoc query than a query that includes parameter markers. As another example, a query that is missing a join criteria could be flagged as likely to be an ad hoc query (unless one of the files has only one row). If a query includes invalid text or fails to run, it can be inferred that the query is more likely to be an ad hoc query than a query that does not include invalid text or that is able to run. Moreover, when a query is received, a query optimizer can be used to generate one or more query plans. The generated query plans can be compared with resource usage or execution time thresholds. In one embodiment, these thresholds are maximum values. The thresholds may be specified by a user or developer. The thresholds may be dynamically determined by a component based on a statistical analysis of historical data. For instance, an average or a standard deviation of resource usage or execution time. If metrics for all of the generated plans are over one or more of the various thresholds, the query is more likely to be an ad hoc query than a query for which the metrics for one or more of the generated plans are less than the thresholds. Accordingly, in various embodiments, it may be inferred that a query is an ad hoc query when the query optimizer is unable to generate a reasonable query plan.

The query originator factor, job type factor, run history factor, or query quality factor and other factors can be assigned numeric values and combined to determine a likelihood score. The likelihood score can be compared to a numeric threshold. In various embodiments, a likelihood score over the threshold indicates a likelihood that a particular query is likely to be ad hoc in nature. In other embodiments, a magnitude of the likelihood score can serve as a confidence score in which the higher the score, the more likely the query is to be an ad hoc query. Table 1 below illustrates one example of different numeric values that could be assigned when a factor is found to be true. In this example, factors are generally assigned points that are positive values. However, points can be zero or negative. For example, the "Query Quality—Parameter Marker Used" factor could be assigned a negative value or zero. Alternatively, this factor could be replaced with a "Query Quality—Parameter Marker Not Used" factor having an assigned point value which is positive.

TABLE 1

| Factor | Points |
| --- | --- |
| Query Originator Outside of Set | 5 |
| Job Type = Interactive | 4 |
| Query Quality - No Index | 4 |
| Query Quality - Wild Card Present | 2 |
| Query Quality - Parameter Marker Used | −1 or 0 |
| Query Quality - Memory Usage | 5 |
| Query Quality - Resource Usage | 5 |

Using the values in table 1, a first query that originates outside of a specified set of IP addresses that is contained in an interactive job would be determined to have a likelihood score of 9. As another example, a second query that originates outside of the specified set of IP addresses, does not use an index, includes a wild card, and uses a parameter marker would be determined to have a likelihood score of 10 or 11, depending on the point value associated with the "Query Quality—Parameter Marker Used" factor.

In various embodiments, a query determined to be ad hoc in nature can be marked. If the same query is run again after it has been marked as ad hoc, the run history factor can be updated. In some embodiments, when a query is run a second time, the query can be determined not to be ad hoc and the marker may be removed. In some embodiments, a query may need to be run two or more times before the query is determined to be ad hoc.

As mentioned above, the memory 204 can include a processing profile generator 316. According to various embodiments, a database query can be associated with a processing profile. When a database query is received, it may be assigned a first processing profile, which may be a default processing profile. In some embodiments, the database query is received with a first processing profile included as part of the query. If a query is determined to be ad hoc in nature, the query can be assigned a second processing profile. In some embodiments, if a likelihood score for a database query exceeds a threshold, the query can be assigned a second processing profile. In other embodiments in which the magnitude of the likelihood score serves as a confidence score, the query can be assigned one of two or more processing profiles. For example, if the likelihood score for a query is x, the query would be assigned a second processing profile. If the likelihood score for a query is y, the query would be assigned a third processing profile. The y score indicates a greater confidence that the query is an ad hoc query than the x score. The third processing profile would incorporate more stringent restrictions on query execution (or include other measures to reduce the possible adverse impact on performance) than the second processing profile. The processing profile generator 316 generates a second (or third, fourth, or other) processing profile to substitute for the first processing profile when it is determined that a database query is likely to be an ad hoc query.

A processing profile can include a priority parameter that specifies a priority or rank of a query with respect to other queries that may be run simultaneously or which are queued up to be run. Moreover, a priority parameter can specify that the execution of a query be blocked under conditions when a load on the system is above a threshold. The threshold may be set to correspond to conditions when the load on the system is high. In practice, when the priority parameter is a priority or rank, the query may be delayed until queries with a higher rank are completed. When the priority parameter requires a comparison of a load with a threshold, the query may be delayed until the load of the system falls below the threshold. In some embodiments, the threshold can be set to zero so that a priority parameter can block execution of the query without regard to the load on the system.

In addition, a processing profile can include a multiprocessing parameter that indicates whether parallel database operations, which may be referred to as symmetric multiprocessing or SMP, are allowed to be performed. For example, in embodiments in which a database is spread across multiple storage devices, each associated with a distinct I/O adapter, it can be possible to access data on multiple storage devices in parallel. In addition, in embodiments in which multiple CPUs or processing cores are provided, the work involved in processing a query can be dispatched to two or more CPUs or cores in parallel. The processing profile can indicate whether these types of parallel operations are to be enabled.

A processing profile can include a resource parameter that specifies an amount of a resource that can be allocated to execute the query. For example, a particular amount of main memory can be specified for storing intermediate or final results. Other examples include a particular number of CPU cycles, I/O device traffic, bus traffic, or network traffic can be specified.

In various embodiments, the processing profile generator 316 can generate two or more processing profiles to be used with different ad hoc likelihood scores. For instance, a second processing profile can be generated for a first query determined to have a likelihood score of 6. The second processing profile may include a multiprocessing parameter that disables parallel processing. A third processing profile can be generated for a second query determined to have a likelihood score of 9. The third processing profile may include a multiprocessing parameter that disables parallel processing and a resource parameter that limits the amount of main memory the query can use.

Figure 4:
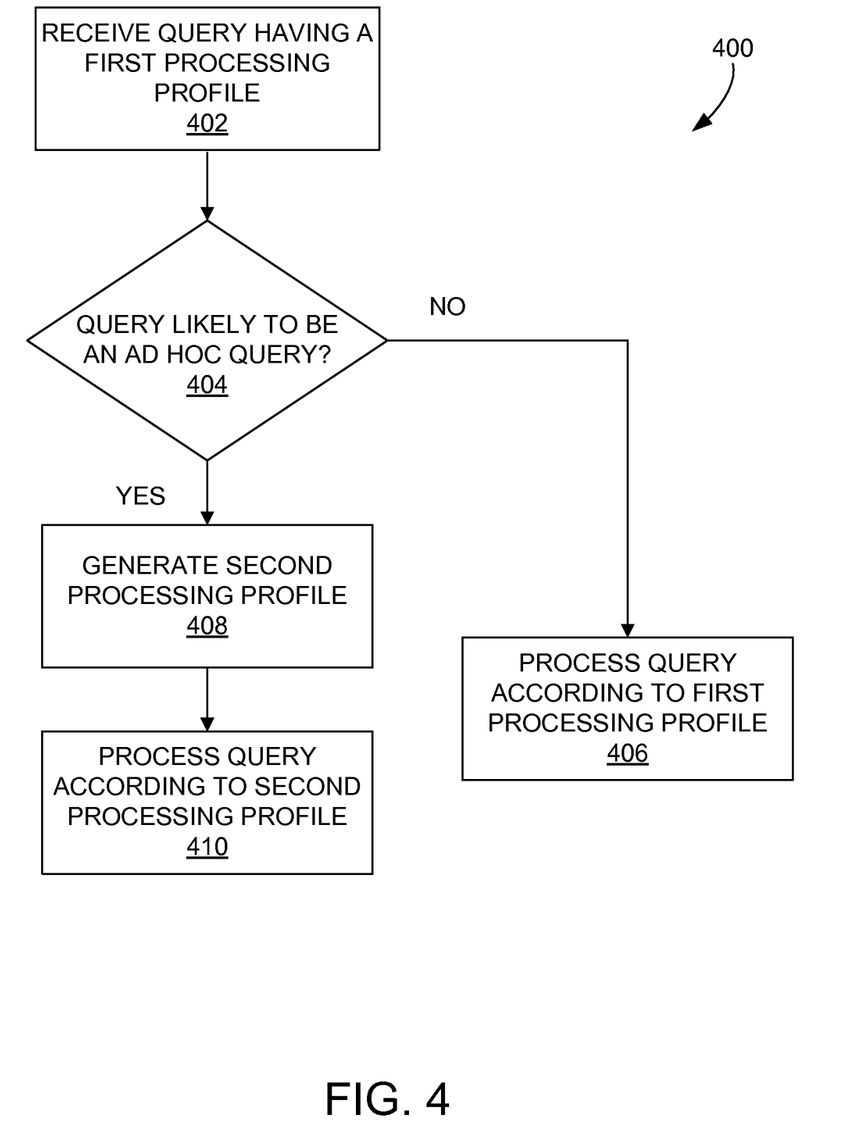
FIG. 4 is a flow chart diagram for a method for processing a database query according to various embodiments.

FIG. 4 is a flow chart diagram for a method 400 for processing a database query according to various embodiments. More specifically, the method 400 is a method for identifying database queries that may have an adverse impact on performance and for handling these queries in a way that reduces the possible adverse impact on performance.

In operation 402, a database query is received. The received query is associated with a first processing profile. The database query may be assigned a first processing profile after it is received. In some embodiments, the database query is received with a first processing profile included as part of the query. The first processing profile can be a default processing profile or a profile requested by the submitter.

In operation 404, it is determined whether the received query is likely to be ad hoc in nature. This determination can be made by the ad hoc determiner 314. As more fully explained above, the determination as to whether a database query is likely to be an ad hoc database query can be made using one or more factors, including, but not limited to, a query originator factor, a job type factor, a run history factor, or a query quality factor.

In operation 406, the query may be processed according to the first processing profile if it is determined in operation 404 that the query is not likely to be ad hoc in nature. On the other hand, if it is determined in operation 404 that the query is likely to be an ad hoc query, a second processing profile is generated in operation 408.

The second processing profile generated in operation 408 can be generated by the processing profile generator 316 in various embodiments. While the operation 408 depicted in FIG. 4 refers to a "second" processing profile, it is intended to mean any processing profile other than the first processing profile. The second profile in operation 408 can refer to a third, fourth, fifth or other processing profile that is to be substituted for the first processing profile when it is determined that a database query is likely to be an ad hoc query. As described above, additional processing profiles can be generated to be used with different ad hoc likelihood scores. A processing profile can include priority, multiprocessing, and resource usage parameters.

In operation 410, the query may be processed according to the second or other processing profile generated in operation 408. When the query is processed using the alternative processing profile, the possible adverse impact on performance associated with the query may be reduced.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for processing a database query, comprising:

receiving a first database query to be executed according to a first processing profile;

determining whether the first database query is likely to be an ad hoc query, wherein the determining of whether the first database query is likely to be an ad hoc query is based on a first likelihood score;

generating, without input from a user, a second processing profile and a third processing profile before executing the first database query in response to determining that the first database query is likely to be an ad hoc query;

running the first database query using the second processing profile, wherein the second processing profile is selected over the third processing profile in response to determining that the first likelihood score is greater than a first confidence threshold and less than a second confidence threshold;

optimizing the second processing profile according to the running of the first database query;

saving the first database query, the second processing profile, and the third processing profile as a persistent storage object;

receiving a second database query;

determining the second database query is likely to be an ad hoc query similar to the first database query based on a second likelihood score, wherein the second likelihood score is greater than the first likelihood score;

invoking, in response to determining the second database query is likely to be an ad hoc query similar to the first database query, the persistent storage object; and running the second database query using the third processing profile, wherein the third processing profile is selected over the second processing profile in response to determining that the second likelihood score is greater than the second confidence threshold.

2. The method of claim 1, wherein the first likelihood score is based on a query originator factor, a job type factor, a run history factor, or a query quality factor.

3. The method of claim 1, further comprising executing the first database query using the second processing profile, wherein the first processing profile includes a first execution priority, and the second processing profile includes a second execution priority, the second execution priority being a lower priority than the first execution priority.

4. The method of claim 3, wherein the third processing profile includes a third execution priority, the third execution priority being a lower priority than the second execution priority; and
wherein the second processing profile is chosen to execute the first database query according to a predetermined threshold.

5. The method of claim 1, further comprising executing the first database query using the second processing profile, wherein the first processing profile includes a parameter that indicates that executing the first database query using parallel database operations is allowed, and the second processing profile includes the parameter, the parameter indicating that executing the first database query using parallel database operations is prohibited.

6. The method of claim 1, further comprising executing the first database query using the second processing profile, wherein the first processing profile includes a first memory allocation, and the second processing profile includes a second memory allocation, the second memory allocation being less than the first memory allocation.

7. The method of claim 1, further comprising executing the first database query using the second processing profile, wherein the second processing profile includes a parameter that delays execution of the first database query.

8. The method of claim 1, wherein the determining of whether the database query is likely to be an ad hoc query further comprises determining a likelihood score using numeric values for a query originator factor, a job type factor, a run history factor, and a query quality factor, and the second processing profile is generated according to the likelihood score.

9. A computing device, comprising:
a processor;
a memory to store a database and a database manager embodied as a plurality of instructions executable by the processor;
the database manager being configured to receive a first database query to be executed according to a first processing profile;
the database manager including:
a determining module to determine whether the first database query is likely to be an ad hoc query, wherein the determining of whether the first database query is likely to be an ad hoc query is based on a first likelihood score;
a profile generating module to generate a second processing profile and a third processing profile without input from a user and before execution of the first database query in response to determining that the first database query is likely to be an ad hoc query; and
a query execution engine to select the second processing profile over the third processing profile in response to determining that the first likelihood score is greater than a first confidence threshold and less than a second confidence threshold and to execute the first database query according to the second processing profile, wherein the second processing profile is optimized according to the running of the first database query and wherein the first database query, the second processing profile, and the third processing profile are saved as a persistent storage object in the memory and the persistent storage object may be invoked by the query execution engine in response to determining a second database query is likely to be an ad hoc query similar to the first database query based on a second likelihood score, wherein the second likelihood score is greater than the first likelihood score, wherein the query execution engine selects the third processing profile over the second processing profile for the execution of the second database query in response to determining that the second likelihood score is greater than the second confidence threshold.

10. The computing device of claim 9, further comprising executing the first database query using the second processing profile, wherein the first processing profile includes a first execution priority, and the second processing profile includes a second execution priority, the second execution priority being a lower priority than the first execution priority.

11. The computing device of claim 9, further comprising executing the first database query using the second processing profile, wherein the first processing profile includes a parameter that indicates that executing the first database query using parallel database operations is allowed, and the second processing profile includes the parameter, the parameter indicating that executing the first database query using parallel database operations is prohibited.

12. The computing device of claim 9, further comprising executing the first database query using the second processing profile, wherein the first processing profile includes a first resource allocation, and the second processing profile includes a second resource allocation, the second resource allocation being less than the first resource allocation.

13. The computing device of claim 9, further comprising executing the first database query using the second processing profile, wherein the second processing profile includes a parameter that blocks execution of the first database query.

14. The computing device of claim 9, wherein the determining of whether the database query is likely to be an ad hoc query further comprises determining a likelihood score using numeric values for a query originator factor, a job type factor, a run history factor, and a query quality factor, and the second processing profile is generated according to the likelihood score.

15. A computer readable storage medium having computer readable program instructions thereon for causing a processor to carry out a method for processing a database query, comprising:
receiving a first database query to be executed according to a first processing profile;
determining whether the first database query is likely to be an ad hoc query, wherein the determining of whether the first database query is likely to be an ad hoc query is based on a first likelihood score;
generating, without input from a user, a second processing profile and a third processing profile before executing the first database query in response to determining that the first database query is likely to be an ad hoc query;
running the first database query using the second processing profile, wherein the second processing profile is selected over the third processing profile in response to determining that the first likelihood score is greater than a first confidence threshold and less than a second confidence threshold;
optimizing the second processing profile according to the running of the first database query;
saving the first database query, the second processing profile, and the third processing profile as a persistent storage object;
receiving a second database query;
determining the second database query is likely to be an ad hoc query similar to the first database query a second likelihood score, wherein the second likelihood score is greater than the first likelihood score;
invoking, in response to determining the second database query is likely to be an ad hoc query similar to the first database query, the persistent storage object; and
running the second database query using the third processing profile, wherein the third processing profile is selected over the second processing profile in response to determining that the second likelihood score is greater than the second confidence threshold.

16. The storage medium of claim 15, further comprising executing the first database query using the second processing profile, wherein the first processing profile includes a first execution priority, and the second processing profile includes a second execution priority, the second execution priority being a lower priority than the first execution priority.

17. The storage medium of claim 15, further comprising executing the first database query using the second processing profile, wherein the first processing profile includes a parameter that indicates that executing the first database query using parallel database operations is allowed, and the second processing profile includes the parameter, the parameter indicating that executing the first database query using parallel database operations is prohibited.

18. The storage medium of claim 15, further comprising executing the first database query using the second processing profile, wherein the first processing profile includes a first memory allocation, and the second processing profile includes a second memory allocation, the second memory allocation being less than the first memory allocation.

19. The storage medium of claim 15, further comprising executing the first database query using the second processing profile, wherein the second processing profile includes a parameter that delays execution of the first database query.

\* \* \* \* \*